United States Patent [19]

Curtis

[11] 4,375,893

[45] Mar. 8, 1983

[54] EXTENDIBLE BUNK STAKE

[76] Inventor: Arney L. Curtis, P.O. Box 232, Canyon City, Oreg. 97820

[21] Appl. No.: 291,376

[22] Filed: Aug. 10, 1981

[51] Int. Cl.$^3$ .............................................. B60P 7/06
[52] U.S. Cl. ................................... 280/146; 105/389; 296/43; 403/109
[58] Field of Search ...................... 296/43, 9; 105/389; 403/109; 280/146

[56] References Cited

U.S. PATENT DOCUMENTS

| | | | |
|---|---|---|---|
| 735,350 | 8/1903 | Donnell | 280/146 |
| 1,231,843 | 7/1917 | Brady | 105/389 |
| 3,674,304 | 7/1972 | Swanson | 296/43 |
| 3,712,637 | 1/1973 | Rysdam | 280/146 |
| 3,838,338 | 6/1958 | Kerley | 296/43 |
| 3,977,717 | 8/1976 | Hassell | 296/43 |

FOREIGN PATENT DOCUMENTS 160390 9/1957 Sweden .

*Primary Examiner*—Robert R. Song
*Attorney, Agent, or Firm*—Kolisch, Hartwell & Dickinson

[57] ABSTRACT

An extendible bunk stake for use on a log truck and the like. The stake includes an upright post adapted to be mounted on a bunk on the truck, and an extension member telescopically extendible from the post from a lowered to a raised position. The extension member is releasably locked in its raised position by a spring-operated latch which cooperates with a latch cover on the post to indicate when the latch is in a locking position. An arm mounted on the member, adjacent its upper end, is shiftable between an upwardly projecting position and an inwardly projecting position where the arm is engageable by a log being lifted by a boom loader, to extend the extension member. The arm is held in its inwardly and upwardly projecting positions by a spring-loaded lock, with arm release from its inwardly extending position and movement toward its upwardly extending position occurring upon continued lifting of such a log beyond the point where the extension member has been fully raised.

8 Claims, 6 Drawing Figures

U.S. Patent  Mar. 8, 1983  4,375,893
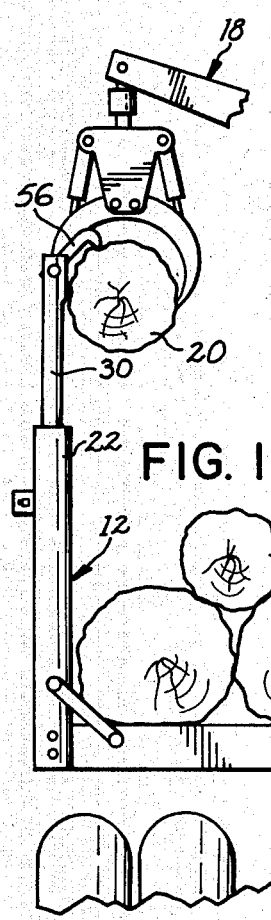
FIG. 1
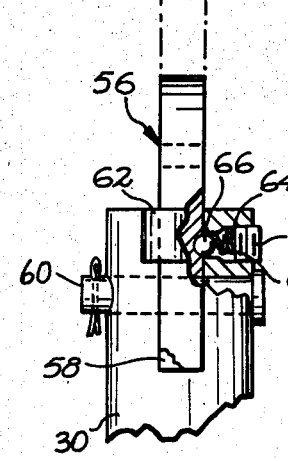
FIG. 4
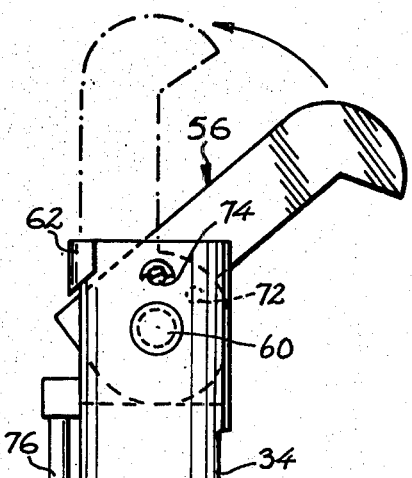
FIG. 2
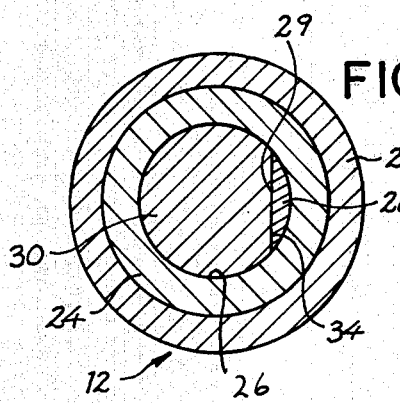
FIG. 3
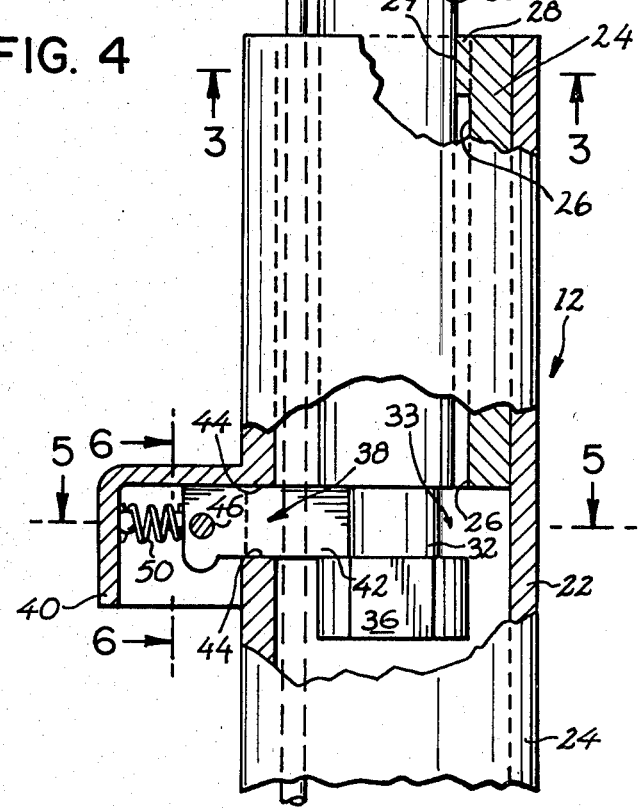
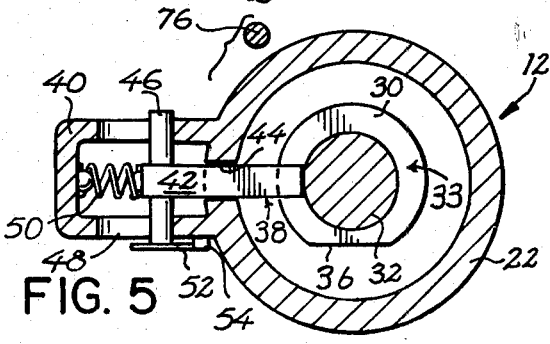
FIG. 6
FIG. 5

EXTENDIBLE BUNK STAKE

BACKGROUND AND SUMMARY

The present invention relates to an extendible bunk stake for use on a log truck and the like, and more particularly, to a stake which can be extended readily by manipulating an extension member in the stake with a log being loaded on the truck by a log loader.

The usual log truck has a log load area defined by longitudinally spaced bunks and upright bunk stakes mounted on outer sides of the bunks. According to conventional practice, logs are loaded into the load area by an operator-controlled boom loader. An experienced operator is able to manipulate logs being handled by the loader to load logs quickly and at accurately placed positions in the load area.

Frequently, where the truck is loaded with relatively small diameter logs, or with logs having a relatively low volume weight, a log truck will be able to carry a greater log-weight load than can be placed in the load area defined by conventional-height stakes. In situations such as these, it is common to increase the height of the load area by extending the bunk stakes.

One type of extendible stake proposed in the prior art is designed to be manually raised by an operator standing on the bunks. An operator, when on a bunk, is particularly vulnerable to being injured by logs being loaded onto the truck, and a number of serious accidents have occurred, particularly in wet weather. Another problem associated with some prior art extendible stakes is that where a stake's extension member is intended to be loosely mounted on the fixed, lower portion of the stake, the extension member may become dislodged during log loading or unloading, with consequent inconvenience or safety hazard to loading personnel.

Another type of extendible bunk stake known in the prior art is a telescopic extension member whose upper end is equipped with a fixed-position claw. The claw is adapted for engagement with a log being handled by a boom-type log loader, allowing the loader-operator to raise the extension member at a safe distance from the truck. For reasons of highway truck regulations, the claw cannot be constructed to extend substantially beyond the outwardly facing side of the extension member. Nor can the claw extend much beyond the inwardly facing side of the extension member without interferring with logs being loaded on the truck and supported by the extension members. Accordingly, one problem which has been experienced because of the fact that the claw is substantially flush with the sides of the extension member is that the loader operator may have considerable difficulty engaging the claw adequately for raising the extension member. An operator must then climb up on the bunk and manually raise the extension member.

It is a general object of the present invention to provide an extendible bunk stake which substantially overcomes the above-mentioned problems associated with prior art extendible bunk stakes.

A more specific object of the present invention is to provide such a stake having an extension member which is equipped with a releasably positionable log-engagement arm which can be moved, by manipulation of a log being handled in a log loader, toward and away from a position facilitating log engagement when the extension member is to be raised.

It is another object of the invention to provide such a stake which provides a visual indication to a log loader operator when the extension member is locked in its raised position.

Still another object of the invention is to provide such a stake having an extension member which can be raised or lowered manually by an operator at a ground position.

The extendible bunk stake of the present invention is intended for use on a log truck and the like. The stake includes an upright post adapted to be mounted on a log bunk and an extension member telescopically extendible from the post's upper end from a lowered position to a raised position, to extend the height of the stake. The extension member is releasably locked in its raised position by a spring-operated latch. An arm mounted on the member, adjacent its upper end, is pivotable between an upright and an inclined inwardly projecting position where the arm is adapted to be engaged by a log being raised adjacent the inwardly facing side of the stake, to raise the stake from its lowered toward its raised position. An arm locking device holds the arm at its inwardly projecting position by tension in a spring in the locking device, as the extension member is being raised by a log engaging the arm and being moved upwardly. When the extension member reaches the upper limit of its travel at its raised position, continued upward movement of the log overcomes the tension in the spring, to effect release of the arm for movement toward its upwardly extending position.

In a preferred embodiment of the invention, the spring-operated latch provides visual indication of when the latch is in a locking position. The stake may also include a rod attached to the extension member, for use in shifting the extension member manually from a ground position. The extension member is preferably guided on the post for axial, nonrotative shifting with respect thereto by guiding structure which permits twist-and-raise movement release of the member from the post.

These and other objects and features of the present invention will become more fully apparent when the following detailed description of preferred embodiments of the invention is read in conjunction with the accompanying drawings.

BRIEF DESCRIPTION OF THE DRAWINGS

FIG. 1 is a fragmentary rear view of a partially loaded log truck equipped with an extendible bunk stake constructed according to the present invention;

FIG. 2 is an enlarged fragmentary, partially cutaway side view of the stake seen in FIG. 1;

FIG. 3 is a sectional view taken along line 3—3 in FIG. 1;

FIG. 4 is a fragmentary, partially cutaway view of an extension member in the stake as seen from the left side of the stake in FIG. 2;

FIG. 5 is a sectional view taken generally along line 4—4 in FIG. 2; and

FIG. 6 is a sectional view taken generally along line 5—5 in FIG. 2.

DETAILED DESCRIPTION OF THE INVENTION

FIG. 1 shows a fragmentary portion of a log truck 10 equipped with a number of bunk stakes, such as stake 12, constructed according to the present invention. The bunk stakes are mounted on the outer ends of horizontally extending log bunks, such as bunk 14, carried on the truck conventionally. The bunks and associated bunk stakes form a log-load area in which logs, such as logs 16, are supported for transport. Also shown in FIG. 1 is the grapple in a conventional boom loader 18 operable to load and unload logs, such as log 20, in the truck's log load area. The loader grapple can be manipulated by an experienced operator with relatively fine control. Such manipulation is used in the operation of the present invention in a manner which will be described.

Stake 12 includes a hollow post 22 which is mounted at an upright position on bunk 14 as seen in FIG. 1. With reference particularly to FIGS. 2 and 3, a cylindrical sleeve 24 is held, as by press fit, in the upper end of the post. The sleeve has a cylindrical bore 26 which terminates, at its upper end, in a shoulder 28 having a flat, outwardly projecting surface 29 as seen in FIG. 3.

Slidably received in the upper end region of the post, and more particularly, within sleeve 24, is a smaller-diameter solid extension member 30 telescopically movable with respect to the post between a lowered position (not shown) and a raised position shown in FIGS. 1, 2 and 5. A reduced-diameter neck 32 (FIGS. 2 and 5) formed in the extension member defines an annular groove 33 adjacent the lower end of the member. An elongate axial section of the extension member between groove 33 and the region adjacent the member's upper end is truncated to form a flat surface 34 which is dimensioned to mate with surface 29 in shoulder 28, as can be appreciated with reference to FIG. 3. Contact between surfaces 29, 34 acts to constrain the extension member against rotative movement in shifting between lowered and raised positions. The extension member is truncated in the region below groove 33 to form a flat surface 36 which is preferably 90° out a plane with respect to surface 34. Surface 36 is dimensioned to mate with the surface 29 to allow axial movement therebetween, when the extension member is rotated to place the two surfaces in contact, wherein the extension member can be removed from the post. It can be appreciated that the just-described structure in the apparatus provides a safety lock which prevents the extension member from being released from the post inadvertantly. Surfaces 34, 36 cooperate with surface 29 to form what is referred to herein as guide means.

Member 30 is supported in its raised position by a spring-loaded latch 38 mounted on the post adjacent the upper end thereof. The outer portion of the latch is contained in a cover 40 which is attached as by welding to the post. The lower side of cover 40 is open to permit access to the latch, for a purpose to be described.

The latch comprises an elongate latch bar 42 which extends slidably through a suitable rectangular opening 44 in post 22. The right end of the latch bar in FIGS. 2 and 5 is dimensioned to be received in groove 33 as shown, to lock the extension member in its raised position. A rod 46 in the latch is carried in the outer end region of the latch bar and extends through a pair of elongate slots, such as slot 48 (FIG. 5) formed in opposite sides of cover 40. The slots cooperate with opening 44 to guide the latch for reciprocal movement in a substantially horizontal direction between a locking position, shown in FIGS. 2 and 5, and a retracted position (not shown) which permits axial sliding of the extension member in the post. A spring 50 interposed between cover 40 and latch bar 42 biases the latch toward its locking position. The latch may be moved from its locking toward its retracted position by a forked tool (not shown) designed to engage rod 46 on opposite sides of the latch bar and which can be manipulated by an operator standing at ground level to provide a levering action which shifts the latch toward its retracted position. Latch 38 is also referred to herein as latch means.

An indicator plate 52 carried at the right end of rod 46 in FIG. 6 cooperates with an indicator strip 54 on the lower side of cover 40 in FIG. 5 to indicate when latch 38 is in the locking position. Specifically, the outer surfaces of both plate 52 and strip 54 are light colored and form a substantially continuous light colored area on the side of the housing when latch 38 is fully moved into groove 33. At other latch positions, the two light colored surfaces are spaced apart, as evidenced by a relatively dark band between the two surfaces. Plate 52 and strip 54 cooperate to form what is also referred to herebelow as indicator means.

Stake 12 further includes an arm 56 (FIGS. 1, 2 and 4) used for engaging a log, such as log 20, when member 30 is to be shifted from its lowered toward its raised position. The arm, which has the general planar shape seen in FIG. 2, is received in a channel 58 formed diametrically in the upper end of member 30 (FIG. 4) and is mounted on the member by a pin 60 for pivoting about the pin between an inwardly extending position, shown in solid lines in FIGS. 2 and 4, and an upwardly extending position, shown in dashed-dot lines in these figures. An arrest plate 62 attached as by welding to the outwardly facing side of the extension member (the left side in FIG. 2) functions to limit the pivotal movement of arm 56 between the two just-mentioned positions. The upper end of arm 56 is tipped as shown in FIGS. 1 and 2 for engaging a log being lifted upwardly below the arm as seen in FIG. 1.

Looking at FIG. 4, a locking device for locking arm 56 in either of its two positions is contained in a variable-diameter bore 64 extending normal to and communicating with channel 58 in the upper end of member 30. A ball 66 contained in the bore is biased against the right side of arm 56 in FIG. 4 by a spring 68, the tension in which is adjustable by an allenhead screw 70 threadedly received in the outer end of bore 64. Ball 66 is adapted to be received in one of two semi-spherical cavities 72, 74 formed in arm 56 to lock the arm in its inwardly or upwardly extending positions, respectively. According to an important feature of the invention, spring 68 is adjustable to a tension which will hold arm 56 at its inwardly projecting position, when the extension member is being raised by a log engaged with the arm. The locking device is also referred to herein as locking means.

Attached to the upper end of member 30 and extending downwardly therefrom, approximately the length of post 22, is a rod 76. As seen in FIG. 5, rod 76 is angularly offset from cover 40. With member 30 in its lowered position—where the shoulder in member 30 at the upper end of surface 34 (FIG. 2) contacts shoulder 28—the rod is substantially coextensive with post 22, and is readily manipulated by an operator standing at ground level to move member 30 between its lowered and raised positions.

In a log-loading operation, such the one depicted in FIG. 1, logs are loaded lengthwise on the truck in the log load area. During initial log loading, the bunk stakes' extension members typically will be in their lowered positions, with associated arms on the extension member being in their upwardly extending positions, to minimize interference with logs being loaded.

With reference particularly to stake 12, which is representative of the bunk stakes on the truck, to shift member 30 to its raised position, the loader operator first manipulates a log, such as log 20 being loaded on the truck, to urge the log against the rounded end of the upwardly projecting arm 56, such urging acting to release the arm from its upwardly projecting position toward its inwardly projecting position shown in FIGS. 1 and 2. The operator then manipulates a log, such as log 20, to a position substantially below the tipped end of the arm as illustrated in FIG. 1. When the log is raised, it engages the arm, with continued upward movement of the log acting to raise member 30 from its lowered toward its raised position. During such shifting, the guide means in the stake prevents rotative movement of the extension member and the associated arm. The ball-lock mechanism in the stake acts to hold the arm at its inwardly projecting position while member 30 is being raised, as noted.

Upward movement of member 30 terminates at its raised position when latch 38 is urged by spring 50 toward its locking position illustrated in FIGS. 2 and 5. Thus locked, the arm is constrained from moving either upwardly or downwardly in the post. Continued upward movement of the log being used to raise the extension member is accommodated by release of arm 56, from its inwardly projecting position, against the biasing of spring 64 and movement of the arm toward its upwardly projecting position. Thus, the extension member is raised and the log-engaging arm therein shifted to its desired out of the way position in a single log-lift operation. Following the raising of the extension member, the loader operator may easily check that the extension member is locked in its raised position by observing the latch indicator described above.

In log-loading situations where it is impractical or impossible to raise the stake's extension members by the log-manipulating procedure just described, a truck operator may extend the stakes relatively easily from a ground level position by the rods connected to the extension members.

While a preferred embodiment of the invention has been described herein, it is apparent that various changes and modifications may be made without departing from the spirit of the invention.

It is claimed and desired to secure by Letters Patent:

1. An extendible bunk stake for a log truck and the like, comprising an upright post adapted to be mounted on the truck for confining a log load thereon, an elongate extension member slidably mounted on said post for axial shifting thereon between a lowered position and a raised position where said member functions to extend the height of the stake, latch means on said post for locking said member releasably in its raised position, an arm mounted on said member, at the upper end thereof, for shifting between an upwardly projecting position and an inwardly projecting position where the arm is adapted to be engaged by a log being raised adjacent the side of the stake facing the truck, to raise the stake from its lowered toward its raised position, and locking means interposed between said extension member and said arm adapted for holding the latter releasably at its inwardly projecting position, as the extension member is being raised by a log engaging the arm, and for releasing such arm for movement toward its upwardly projecting position upon continued upward movement of such a log beyond the point where said extension member has reached its raised position.

2. The stake of claim 1, wherein said locking means includes a spring tensionably interposed between extension member and said arm.

3. The stake of claim 2, wherein the tension in said spring is adjustable to vary the force required to effect arm release from its inwardly extending position.

4. The stake of claim 1, which further includes a rod attached to said member, adjacent its upper end, extending substantially along the length of said member, adjacent said post, for use in shifting said member manually toward its raised position.

5. The stake of claim 1, which further includes guide means interposed between said post and said member for preventing axial rotation of said member as the same is moved between its lowered and raised positions.

6. The stake of claim 5, wherein said guide means accommodates axial rotation of said member, at an axial position above its raised position, to a rotated position which permits axial removal of the member from the post.

7. The stake of claim 1, wherein said latch means includes a latch bar which is reciprocatable in a direction substantially normal to the direction of movement of said extension member, toward and away from a locking position, and a spring which biases said latch bar toward said locking position.

8. The stake of claim 7, which further includes indicator means for indicating when said latch means is in its locking position.

* * * * *